US010961003B2

(12) United States Patent
Banuelos et al.

(10) Patent No.: US 10,961,003 B2
(45) Date of Patent: Mar. 30, 2021

(54) TELESCOPING FILL STATION SHROUD FOR A BLOW/FILL/SEAL PACKAGING MACHINE

(71) Applicant: Weiler Engineering, Inc., Elgin, IL (US)

(72) Inventors: Juan J. Banuelos, McHenry, IL (US); Paul Novorolsky, DeKalb, IL (US); Mark Stevenson, Lombard, IL (US); Joseph Immordino, Itasca, IL (US)

(73) Assignee: Weiler Engineering, Inc., Elgin, IL (US)

(*) Notice: Subject to any disclaimer, the term of this patent is extended or adjusted under 35 U.S.C. 154(b) by 15 days.

(21) Appl. No.: 16/002,388

(22) Filed: Jun. 7, 2018

(65) Prior Publication Data

US 2019/0375528 A1 Dec. 12, 2019

(51) Int. Cl.
*B65B 39/02* (2006.01)
*B65B 3/00* (2006.01)
*B65B 3/02* (2006.01)

(52) U.S. Cl.
CPC .............. *B65B 39/02* (2013.01); *B65B 3/003* (2013.01); *B65B 3/022* (2013.01)

(58) Field of Classification Search
USPC ........................................................ 141/26
See application file for complete search history.

(56) References Cited

U.S. PATENT DOCUMENTS

| 5,279,670 A * | 1/1994 | Watanabe ......... H01L 21/67115 118/715 |
| 6,171,293 B1 * | 1/2001 | Rowley ............... B01L 3/50825 604/403 |
| 7,963,830 B2 * | 6/2011 | Luddy ..................... F24C 15/20 454/49 |
| 9,440,754 B2 * | 9/2016 | Colangelo ............... B65B 3/022 |
| 2001/0017021 A1 * | 8/2001 | Sanfilippo ............. B65B 31/028 53/432 |
| 2016/0324998 A1 * | 11/2016 | Reed ....................... B29C 49/04 |

* cited by examiner

*Primary Examiner* — Mary E McManmon
*Assistant Examiner* — Christopher M Afful
(74) *Attorney, Agent, or Firm* — Olson & Cepuritis, Ltd.

(57) ABSTRACT

In a blow/fill/seal packaging machine, aseptic environment is provided by a telescoping fill station shroud through which a sterile curtain gas flows. The telescoping fill station shroud includes an open-ended lower sleeve, an open-ended upper sleeve slidably coacting with the open-ended lower sleeve, and a manifold plate mounted over a proximal end portion of the upper sleeve.

8 Claims, 3 Drawing Sheets

TELESCOPING FILL STATION SHROUD FOR A BLOW/FILL/SEAL PACKAGING MACHINE

FIELD OF INVENTION

This invention relates to blow/fill/seal packaging machines. More particularly, this invention relates to a protective shroud for a fill station in a blow/fill/seal packaging machine.

BACKGROUND OF INVENTION

Aseptic processing is important for packaging pharmaceutical products. Blow/fill/seal or BFS technology is a convenient manufacturing technique used to produce liquid-filled containers. A typical blow/fill/seal machine is described in U.S. Pat. No. 4,707,966 to Weiler et al. A container is formed, filled, and sealed in a continuous operation in an enclosed environment. Pharmaceutical liquid dosage forms can be aseptically manufactured in this manner provided precautions are taken to maintain an aseptic environment.

The present invention provides a convenient and efficient means for maintaining an enclosed aseptic region around a fill station of a blow/fill/seal packaging machine.

SUMMARY OF INVENTION

A telescoping fill station shroud in a blow/fill/seal packaging machine surrounds a blowing and filling mandrel and guards against contamination of produced aseptically filled packages. The fill station shroud is particularly advantageous in the production of liquid filled vials.

The telescoping fill station shroud is positioned around and shields a fill station mandrel. The fill station shroud includes telescoping open-ended sleeves and a manifold plate. An open-ended upper sleeve is slidably received over an open-ended lower sleeve, or vice versa, and the manifold plate is mounted over a proximal end portion of the upper sleeve.

When the upper sleeve is slidably received over the lower sleeve, the lower sleeve has an external collar at a distal end portion thereof to which a support arm can be attached.

An access aperture sized to receive a filling mandrel is defined by the manifold plate, as well as at least one curtain gas inlet port which is in flow communication with the upper sleeve. Preferably, a pair of opposed curtain gas inlet ports are defined in the manifold plate.

DESCRIPTION OF PREFERRED EMBODIMENTS

For ease of description, the telescoping fill system shroud embodying this invention will be described in its normal (upright) operating position. Terms such as upper, lower, horizontal, etc. will be used with reference to its normal operating position. The device embodying the invention, however, may be fabricated, stored, transported, and sold in an orientation other than the position described herein.

Figure 1:
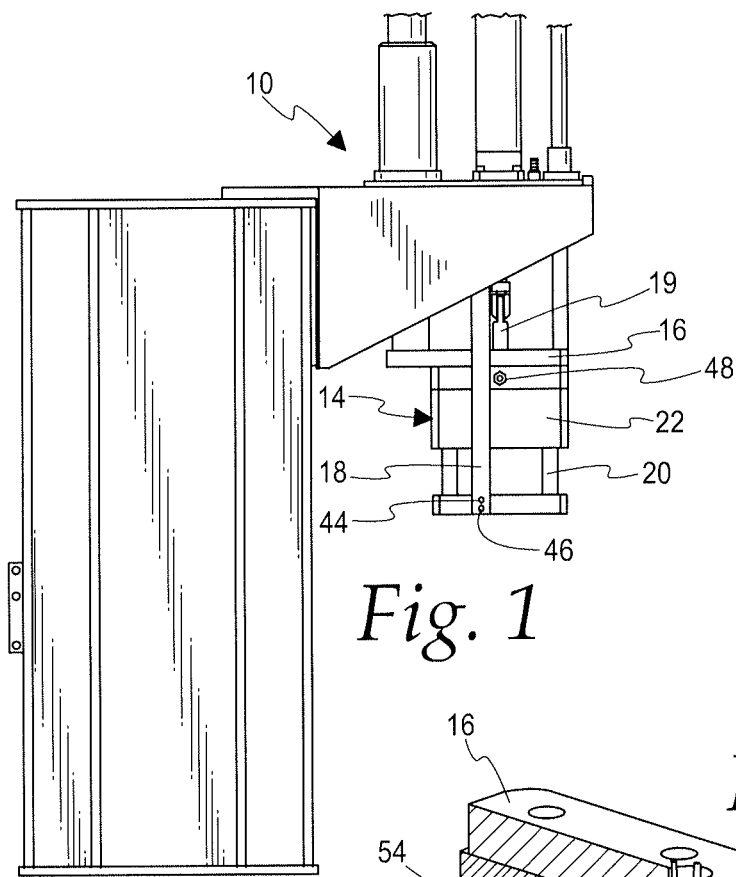
FIG. 1 is a side elevation view of a blow-and-fill station in a blow/fill/seal packaging machine equipped with a telescoping fill station shroud embodying the invention.
Figure 2:
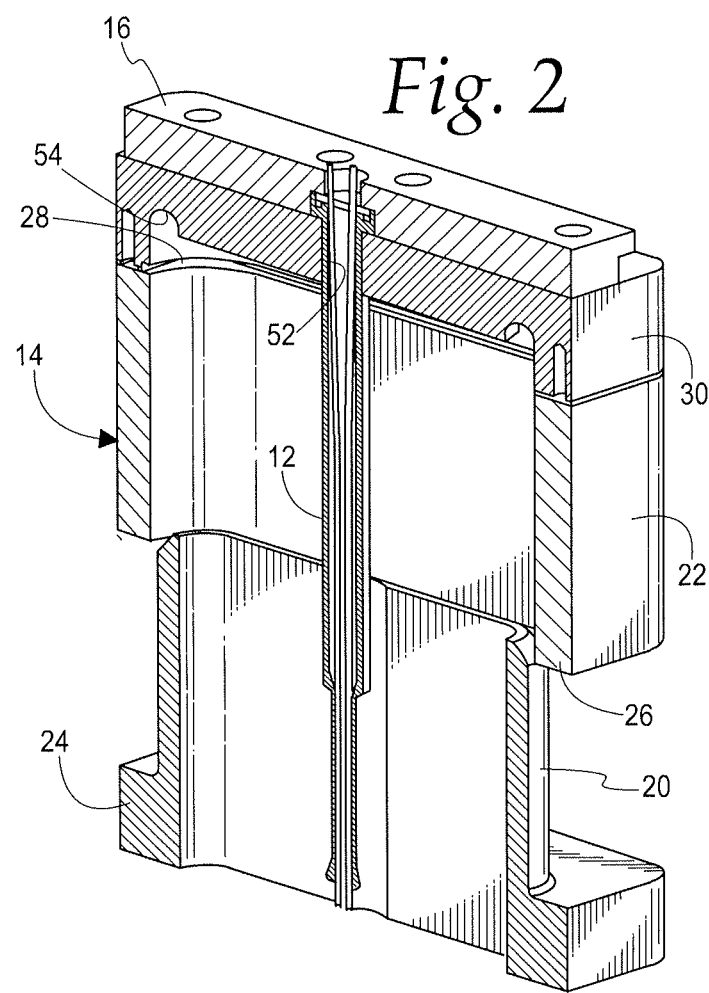
FIG. 2 is a sectional perspective view of the telescoping fill station shroud enveloping a filling mandrel and showing interior detail.

Referring to FIGS. 1 and 2, fill station 10 of a blow/fill/seal packaging machine includes a fill system equipped with a filling mandrel 12 surrounded by a telescoping fill station shroud 14 held in place by fill system carrier plate 16 and shroud support arm 18. During the course of a blow-and-fill operation upper and lower parts of the shroud 14 telescope to accommodate reciprocating movement of mandrel 12 and carrier plate 16. The reciprocating movement is controlled by fill system positioning arm 19 which is connected to carrier plate 16. Fill system positioning arm 19 positions mandrel 12 between an upper, rest position and a lower, blow and fill position.

Figure 3:
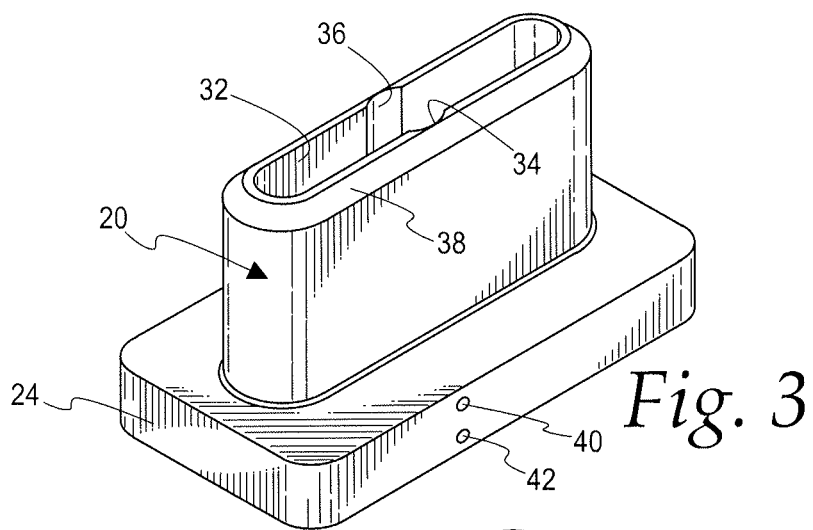
FIG. 3 is a perspective view of the lower sleeve of a telescoping fill station shroud embodying the invention.
Figure 4:
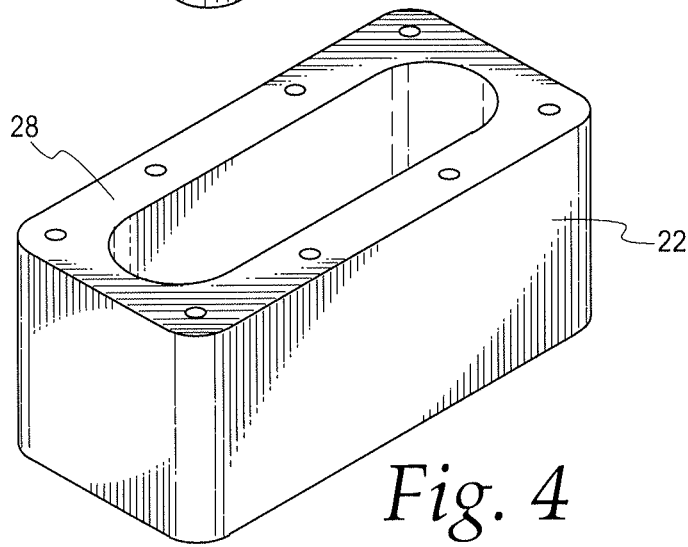
FIG. 4 is a perspective view of the upper sleeve of a telescoping fill station shroud embodying the invention and sized to be slidably received over the lower sleeve shown in FIG. 3.

FIGS. 2, 3 and 4 show telescoping fill station shroud 14 and parts thereof in greater detail. In particular, FIG. 2 shows a fill station shroud 14 in its upper, rest position, mounted to carrier plate 16. Open-ended upper sleeve 22 of shroud 14 is slidably received over open-ended lower sleeve 20 of shroud 14 as mandrel 12 is moved to a lower, fill position within a parison segment positioned in a mold below (not shown). Lower sleeve 20 and upper sleeve 22 both preferably have an oblong configuration.

If desired, the sleeve positions relative to one another can be reversed. That is, upper sleeve 22 can be sized so as to be slidably received within lower sleeve 20.

Lower sleeve 20 is provided with an optional, external collar 24, attached to shroud support arm 18, which engages distal periphery 26 of upper sleeve 22 during storage or shipping. Proximal periphery 28 of upper sleeve 22 is attached to manifold plate 30 which, in turn, is connected to carrier plate 16. Collar 24 is preferred for the embodiment where the upper sleeve is received slidably over the lower sleeve.

As best seen in FIG. 3, inner face 32 of lower sleeve 20 preferably defines opposed longitudinal channels 34 and 36 to accommodate the outer diameter of a filling mandrel. Upper end portion 38 of lower sleeve 20 can be beveled, if desired. Opposite sides of collar 24 are provided with mounting apertures 40 and 42 for receiving respective fasteners 44 and 46 that connect lower sleeve to support arm 18 (FIG. 1).

The lower sleeve 20, as well as the upper sleeve 22, preferably have an oblong, i.e., oval or rectangular, transverse cross-section so that more than one mandrel such as mandrel 12 can be positioned within a single telescoping fill station shroud, if desired.

Figure 5:
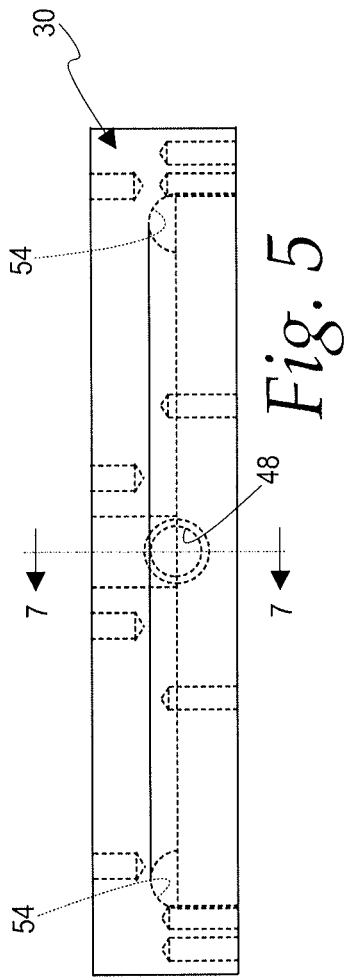
FIG. 5 is a side elevation view of a manifold plate adapted for mounting over a proximal end portion of the upper sleeve shown in FIG. 4.
Figure 6:
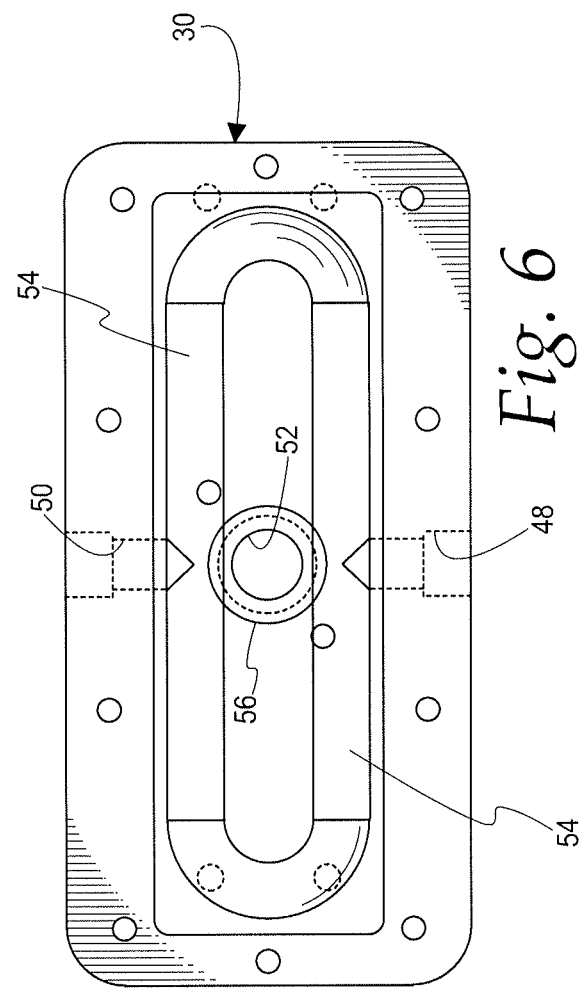
FIG. 6 is a bottom view of the manifold plate shown in FIG. 5.
Figure 7:
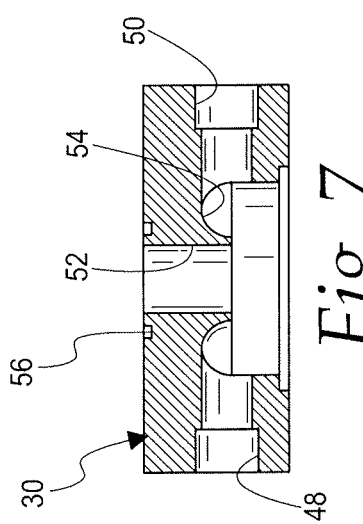
FIG. 7 is a sectional view of the manifold plate shown in FIG. 5 and taken along plane 7-7.

Referring to FIGS. 5, 6 and 7, manifold plate 30 defines curtain gas inlet ports 48 and 50 in the side wall of manifold plate 30, and through aperture 52 for receiving mandrel 12. Inner peripheral channel 54 in manifold plate 30 is sized to receive upper end portion 38 of lower sleeve 20. O-ring seat 56 is defined in mandrel plate 30 circumscribing through aperture 52.

Figure 8:
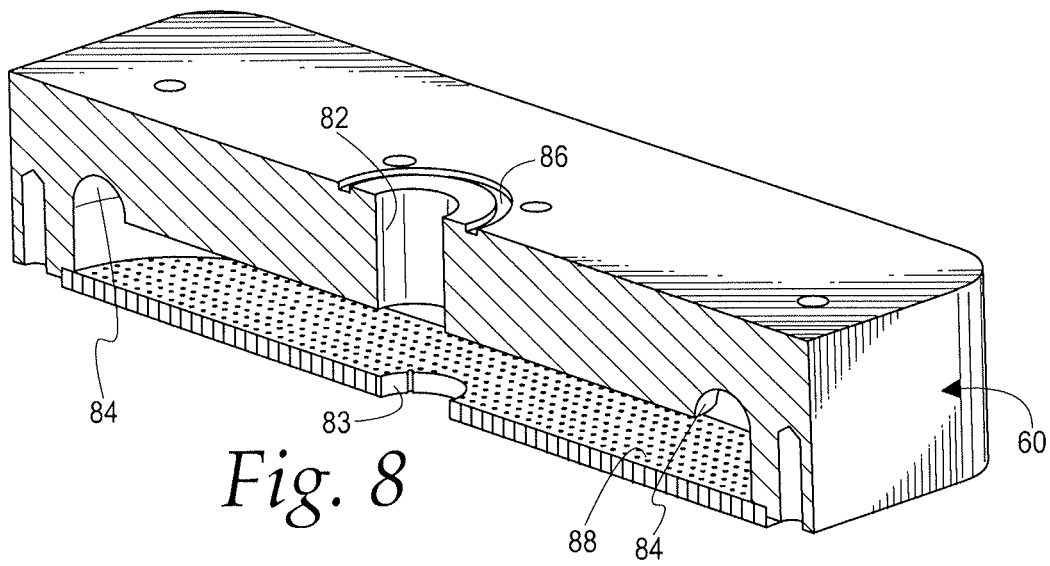
FIG. 8 is a sectional perspective view of a manifold plate provided with a curtain gas distributor.

An alternate embodiment of the manifold plate is shown in FIG. 8. In this particular embodiment, manifold plate 60 is provided with a curtain gas distributor such as perforated plate 88, a screen, a mesh, and the like. The curtain gas distributor is situated downstream from the curtain gas inlet port or ports and is positioned over the proximal end of the open-ended upper sleeve. In this manner, the curtain gas stream introduced into the upper sleeve via peripheral channel 84 can be more evenly distributed in the open-ended lower sleeve. Aperture 82 in manifold plate 60 and co-axial aperture 83 in perforated plate 88 accommodate a filling mandrel. O-ring seat 86 is provided in manifold plate 60 around aperture 82.

In operation, a curtain gas such as sterile air or nitrogen is introduced, preferably as laminar flow, into the telescoping fill station shroud via curtain gas inlet ports 48 and 50 under positive pressure, passes downwardly through the shroud, and exits below the shroud, thereby isolating mandrel 12 as well as the parison segment from ambient atmosphere.

The telescoping fill station shroud can be disposable or reusable, as desired. Suitable materials of construction are polypropylene, polyethylene, tetrafluoroethylene, 316 stainless steel, and the like. A reusable shroud must be made of a sterilizable USP Class 6 material.

The foregoing description and drawings are intended as illustrative and are not to be taken as limiting. Variations, modifications, and rearrangements of parts are possible without departing from the spirit and scope of the described embodiments and will readily present themselves to those skilled in the art.

The invention claimed is:

1. A telescoping fill station shroud for a blow/fill/seal packaging machine which comprises
an open-ended upper sleeve;
an open-ended lower sleeve slidably coacting with the open-ended upper sleeve;
a manifold plate mounted over a proximal end portion of the upper sleeve; and
the manifold plate defining an access aperture for a filling mandrel and at least one curtain gas inlet port in flow communication with the upper sleeve.

2. The telescoping fill station shroud in accordance with claim 1 wherein the manifold plate is provided with a curtain gas distributor downstream from said at least one curtain gas inlet port.

3. A telescoping fill station shroud for a blow/fill/seal packaging machine which comprises
an open-ended lower sleeve;
an open-ended upper sleeve slidably received over the lower sleeve; and
a manifold plate mounted over a proximal end portion of the upper sleeve;
the lower sleeve having an external collar at a distal end portion thereof, and the manifold plate defining an access aperture for a filling mandrel and at least one curtain gas inlet port in flow communication with the upper sleeve.

4. The telescoping fill station shroud in accordance with claim 3 wherein the manifold plate defines a pair of opposed curtain gas inlet ports.

5. The telescoping fill station shroud in accordance with claim 3 wherein the manifold plate defines an o-ring seat around the access aperture.

6. The telescoping fill station shroud in accordance with claim 3 wherein the lower sleeve and the upper sleeve have an oblong configuration.

7. The telescoping fill station shroud in accordance with claim 3 wherein the manifold plate is provided with a curtain gas distributor situated downstream from said at least one curtain gas inlet port.

8. The telescoping fill station shroud in accordance with claim 7 wherein the curtain gas distributor is a perforated plate over proximal end of the open ended upper sleeve.

* * * * *